US012743867B2

(12) United States Patent
Kim

(10) Patent No.: US 12,743,867 B2
(45) Date of Patent: Sep. 22, 2026

(54) LUMINANCE ADJUSTMENT BETWEEN DIFFERENT RESOLUTIONS

(71) Applicant: LX SEMICON CO., LTD., Daejeon (KR)

(72) Inventor: Bo Sung Kim, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 282 days.

(21) Appl. No.: 18/205,737

(22) Filed: Jun. 5, 2023

(65) Prior Publication Data

US 2024/0020943 A1 Jan. 18, 2024

(30) Foreign Application Priority Data

Jul. 13, 2022 (KR) ........................ 10-2022-0086056

(51) Int. Cl.

*G06V 10/60* (2022.01)
*G06T 7/11* (2017.01)
*G06V 10/50* (2022.01)
*G06V 10/70* (2022.01)

(52) U.S. Cl.

CPC ................ *G06V 10/60* (2022.01); *G06T 7/11* (2017.01); *G06V 10/507* (2022.01); *G06V 10/70* (2022.01)

(58) Field of Classification Search

CPC ...... G06V 10/60; G06V 10/507; G06V 10/70; G06V 10/42; G06T 7/11; G06T 2207/10024; G06T 2207/20021; G06T 5/94; G06T 7/90; G06T 5/92; G06T 2207/20208; H04N 23/76; H04N 17/00; H04N 23/71

USPC .......................................................... 382/274

See application file for complete search history.

(56) References Cited

U.S. PATENT DOCUMENTS

2011/0085734 A1* 4/2011 Berg .................. G06F 16/7834 707/723
2016/0005201 A1* 1/2016 Kunkel ............ H04N 21/42202 345/589
2018/0336669 A1* 11/2018 Mertens ................. H04N 5/445
2019/0306384 A1* 10/2019 Hirotsune ............. G06T 7/0004
2020/0007834 A1* 1/2020 Uemura ............... H04N 9/3194
2021/0314478 A1* 10/2021 Cha ........................ H04N 23/71

(Continued)

FOREIGN PATENT DOCUMENTS

KR 10-1828180 B1 2/2018
KR 10-1928426 B1 12/2018

(Continued)

*Primary Examiner* — Jennifer Mehmood
*Assistant Examiner* — Heath E. Wells
(74) *Attorney, Agent, or Firm* — ROTHWELL, FIGG, ERNST & MANBECK, P.C.

(57) ABSTRACT

According to an embodiment of the disclosure, an image processing device, which is capable of detecting a distortable pattern that is likely to be distorted, includes a block luminance acquirer configured to divide a plurality of pixels constituting an input image into a plurality of blocks and acquire luminance for each of the plurality of blocks, a pattern detector configured to analyze a luminance correlation between the plurality of blocks and detect a distortable pattern, and a luminance corrector configured to correct the luminance of the plurality of pixels or bypass the plurality of pixels according to whether the distortable pattern is detected.

16 Claims, 11 Drawing Sheets

(56) References Cited

U.S. PATENT DOCUMENTS

2022/0262293 A1* 8/2022 Nijland .................... G09G 5/10
2023/0057659 A1* 2/2023 Takeda ................. H04N 23/667

FOREIGN PATENT DOCUMENTS

KR 101931466 B1 * 12/2018 ............... G06T 7/90
KR 10-2022-0025552 A 3/2022

* cited by examiner

BL

| | 1 | 2 | 3 | 4 | 5 | 6 | 7 | 8 |
|---|---|---|---|---|---|---|---|---|
| 1 | 18 | 49 | 80 | 111 | 142 | 173 | 204 | 236 |
| 2 | 18 | 49 | 80 | 111 | 142 | 173 | 204 | 236 |
| 3 | 18 | 49 | 80 | 111 | 142 | 173 | 204 | 236 |
| 4 | 18 | 49 | 80 | 111 | 142 | 173 | 204 | 236 |
| 5 | 18 | 49 | 80 | 111 | 142 | 173 | 204 | 236 |
| 6 | 18 | 49 | 80 | 111 | 142 | 173 | 204 | 236 |
| 7 | 18 | 49 | 80 | 111 | 142 | 173 | 304 | 236 |
| 8 | 18 | 49 | 80 | 111 | 142 | 173 | 204 | 236 |

Y Axis

X Axis

| sub1(1,1)= lum(1,1)-lum(2,1) | sub1(2,1)= lum(2,1)-lum(3,1) | sub1(3,1)= lum(3,1)-lum(4,1) | sub1(4,1)= lum(4,1)-lum(5,1) | sub1(5,1)= lum(5,1)-lum(6,1) | sub1(6,1)= lum(6,1)-lum(7,1) | sub1(7,1)= lum(7,1)-lum(8,1) |
|---|---|---|---|---|---|---|
| sub1(1,2)= lum(1,2)-lum(2,2) | sub1(2,2)= lum(2,2)-lum(3,2) | sub1(3,2)= lum(3,2)-lum(4,2) | sub1(4,2)= lum(4,2)-lum(5,2) | sub1(5,2)= lum(5,2)-lum(6,2) | sub1(6,2)= lum(6,2)-lum(7,2) | sub1(7,2)= lum(7,2)-lum(8,2) |
| sub1(1,3)= lum(1,3)-lum(2,3) | sub1(2,3)= lum(2,3)-lum(3,3) | sub1(3,3)= lum(3,3)-lum(4,3) | sub1(4,3)= lum(4,3)-lum(5,3) | sub1(5,3)= lum(5,3)-lum(6,3) | sub1(6,3)= lum(6,3)-lum(7,3) | sub1(7,3)= lum(7,3)-lum(8,3) |
| sub1(1,4)= lum(1,4)-lum(2,4) | sub1(2,4)= lum(2,4)-lum(3,4) | sub1(3,4)= lum(3,4)-lum(4,4) | sub1(4,4)= lum(4,4)-lum(5,4) | sub1(5,4)= lum(5,4)-lum(6,4) | sub1(6,4)= lum(6,4)-lum(7,4) | sub1(7,4)= lum(7,4)-lum(8,4) |
| sub1(1,5)= lum(1,5)-lum(2,5) | sub1(2,5)= lum(2,5)-lum(3,5) | sub1(3,5)= lum(3,5)-lum(4,5) | sub1(4,5)= lum(4,5)-lum(5,5) | sub1(5,5)= lum(5,5)-lum(6,5) | sub1(6,5)= lum(6,5)-lum(7,5) | sub1(7,5)= lum(7,5)-lum(8,5) |
| sub1(1,6)= lum(1,6)-lum(2,6) | sub1(2,6)= lum(2,6)-lum(3,6) | sub1(3,6)= lum(3,6)-lum(4,6) | sub1(4,6)= lum(4,6)-lum(5,6) | sub1(5,6)= lum(5,6)-lum(6,6) | sub1(6,6)= lum(6,6)-lum(7,6) | sub1(7,6)= lum(7,6)-lum(8,6) |
| sub1(1,7)= lum(1,7)-lum(2,7) | sub1(2,7)= lum(2,7)-lum(3,7) | sub1(3,7)= lum(3,7)-lum(4,7) | sub1(4,7)= lum(4,7)-lum(5,7) | sub1(5,7)= lum(5,7)-lum(6,7) | sub1(6,7)= lum(6,7)-lum(7,7) | sub1(7,7)= lum(7,7)-lum(8,7) |
| sub1(1,8)= lum(1,8)-lum(2,8) | sub1(2,8)= lum(2,8)-lum(3,8) | sub1(3,8)= lum(3,8)-lum(4,8) | sub1(4,8)= lum(4,8)-lum(5,8) | sub1(5,8)= lum(5,8)-lum(6,8) | sub1(6,8)= lum(6,8)-lum(7,8) | sub1(7,8)= lum(7,8)-lum(8,8) |

Y Axis

X Axis

FIG. 7

| | BL11 | BL21 | BL31 | | | | |
|---|---|---|---|---|---|---|---|
| RBL | var1(1,1)= sub1(1,1)-sub1(2.1) | var1(2,1)= sub1(1,1)-sub1(2.1) | var1(3,1)= sub1(1,1)-sub1(3.1) | var1(4,1)= sub1(1,1)-sub1(4.1) | var1(5,1)= sub1(1,1)-sub1(5.1) | var1(6,1)= sub1(1,1)-sub1(6.1) | var1(7,1)= sub1(1,1)-sub1(7.1) |
| BL12 | var1(1,2)= sub1(1,1)-sub1(1.2) | var1(2,2)= sub1(1,1)-sub1(2.2) | var1(3,2)= sub1(1,1)-sub1(3.2) | var1(4,2)= sub1(1,1)-sub1(4.2) | var1(5,2)= sub1(1,1)-sub1(5.2) | var1(6,2)= sub1(1,1)-sub1(6.2) | var1(7,2)= sub1(1,1)-sub1(7.2) |
| | var1(1,3)= sub1(1,1)-sub1(1.3) | var1(2,3)= sub1(1,1)-sub1(2.3) | var1(3,3)= sub1(1,1)-sub1(3.3) | var1(4,3)= sub1(1,1)-sub1(4.3) | var1(5,3)= sub1(1,1)-sub1(5.3) | var1(6,3)= sub1(1,1)-sub1(6.3) | var1(7,3)= sub1(1,1)-sub1(7.3) |
| | var1(1,4)= sub1(1,1)-sub1(1.4) | var1(2,4)= sub1(1,1)-sub1(2.4) | var1(3,4)= sub1(1,1)-sub1(3.4) | var1(4,4)= sub1(1,1)-sub1(4.4) | var1(5,4)= sub1(1,1)-sub1(5.4) | var1(6,4)= sub1(1,1)-sub1(6.4) | var1(7,4)= sub1(1,1)-sub1(7.4) |
| | var1(1,5)= sub1(1,1)-sub1(1.5) | var1(2,5)= sub1(1,1)-sub1(2.5) | var1(3,5)= sub1(1,1)-sub1(3.5) | var1(4,5)= sub1(1,1)-sub1(4.5) | var1(5,5)= sub1(1,1)-sub1(5.5) | var1(6,5)= sub1(1,1)-sub1(6.5) | var1(7,5)= sub1(1,1)-sub1(7.5) |
| | var1(1,6)= sub1(1,1)-sub1(1.6) | var1(2,6)= sub1(1,1)-sub1(2.6) | var1(3,6)= sub1(1,1)-sub1(3.6) | var1(4,6)= sub1(1,1)-sub1(4.6) | var1(5,6)= sub1(1,1)-sub1(5.6) | var1(6,6)= sub1(1,1)-sub1(6.6) | var1(7,6)= sub1(1,1)-sub1(7.6) |
| | var1(1,7)= sub1(1,1)-sub1(1.7) | var1(2,7)= sub1(1,1)-sub1(2.7) | var1(3,7)= sub1(1,1)-sub1(3.7) | var1(4,7)= sub1(1,1)-sub1(4.7) | var1(5,7)= sub1(1,1)-sub1(5.7) | var1(6,7)= sub1(1,1)-sub1(6.7) | var1(7,7)= sub1(1,1)-sub1(7.7) |
| | var1(1,8)= sub1(1,1)-sub1(1.8) | var1(2,8)= sub1(1,1)-sub1(2.8) | var1(3,8)= sub1(1,1)-sub1(3.8) | var1(4,8)= sub1(1,1)-sub1(4.8) | var1(5,8)= sub1(1,1)-sub1(5.8) | var1(6,8)= sub1(1,1)-sub1(6.8) | var1(7,8)= sub1(1,1)-sub1(7.8) |

Y Axis

X Axis

FIG. 8
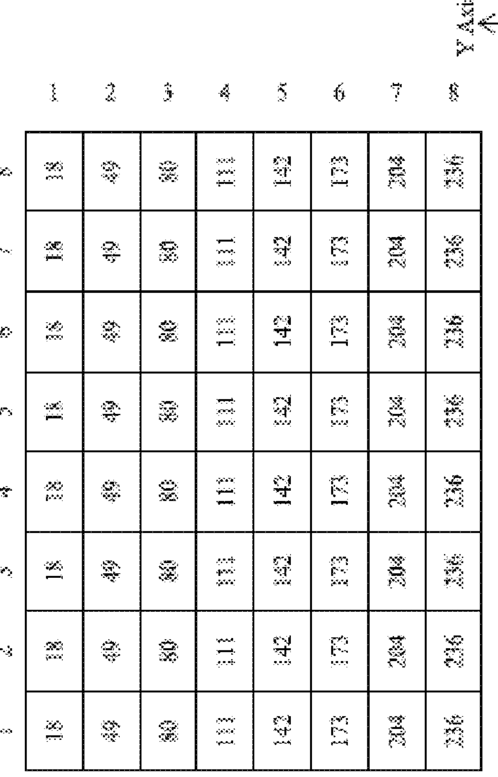
| 1 | 2 | 3 | 4 | 5 | 6 | 7 | 8 | |
|---|---|---|---|---|---|---|---|---|
| 18 | 18 | 18 | 18 | 18 | 18 | 18 | 18 | 1 |
| 49 | 49 | 49 | 49 | 49 | 49 | 49 | 49 | 2 |
| 80 | 80 | 80 | 80 | 80 | 80 | 80 | 80 | 3 |
| 111 | 111 | 111 | 111 | 111 | 111 | 111 | 111 | 4 |
| 142 | 142 | 142 | 142 | 142 | 142 | 142 | 142 | 5 |
| 173 | 173 | 173 | 173 | 173 | 173 | 173 | 173 | 6 |
| 204 | 204 | 204 | 204 | 204 | 204 | 204 | 204 | 7 |
| 236 | 236 | 236 | 236 | 236 | 236 | 236 | 236 | 8 |
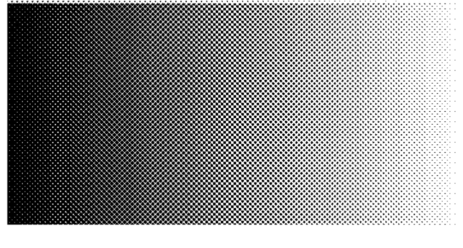

BBL

BL12

| | | | | | | | |
|---|---|---|---|---|---|---|---|
| var2(1,1)= sub2(1,1)-sub2(1,2) | var2(2,1)= sub2(1,1)-sub2(2,1) | var2(3,1)= sub2(1,1)-sub2(3,1) | var2(4,1)= sub2(1,1)-sub2(5,1) | var2(5,1)= sub2(1,1)-sub2(6,1) | var2(6,1)= sub2(1,1)-sub2(7,1) | var2(7,1)= sub2(1,1)-sub2(7,1) | var2(8,1)= sub2(1,1)-sub2(8,1) |
| var2(1,2)= sub2(1,1)-sub2(1,2) | var2(2,2)= sub2(1,1)-sub2(2,2) | var2(3,2)= sub2(1,1)-sub2(3,2) | var2(4,2)= sub2(1,1)-sub2(5,2) | var2(5,2)= sub2(1,1)-sub2(6,2) | var2(6,2)= sub2(1,1)-sub2(7,2) | var2(7,2)= sub2(1,1)-sub2(7,2) | var2(8,2)= sub2(1,1)-sub2(8,2) |
| var2(1,3)= sub2(1,1)-sub2(1,3) | var2(2,3)= sub2(1,1)-sub2(2,3) | var2(3,3)= sub2(1,1)-sub2(4,3) | var2(4,3)= sub2(1,1)-sub2(5,3) | var2(5,3)= sub2(1,1)-sub2(6,3) | var2(6,3)= sub2(1,1)-sub2(7,3) | var2(7,3)= sub2(1,1)-sub2(7,3) | var2(8,3)= sub2(1,1)-sub2(8,3) |
| var2(1,4)= sub2(1,1)-sub2(1,4) | var2(2,4)= sub2(1,1)-sub2(2,4) | var2(3,4)= sub2(1,1)-sub2(4,4) | var2(4,4)= sub2(1,1)-sub2(5,4) | var2(5,4)= sub2(1,1)-sub2(6,4) | var2(6,4)= sub2(1,1)-sub2(7,4) | var2(7,4)= sub2(1,1)-sub2(7,4) | var2(8,4)= sub2(1,1)-sub2(8,4) |
| var2(1,5)= sub2(1,1)-sub2(1,5) | var2(2,5)= sub2(1,1)-sub2(2,5) | var2(3,5)= sub2(1,1)-sub2(4,5) | var2(4,5)= sub2(1,1)-sub2(5,5) | var2(5,5)= sub2(1,1)-sub2(6,5) | var2(6,5)= sub2(1,1)-sub2(7,5) | var2(7,5)= sub2(1,1)-sub2(7,5) | var2(8,5)= sub2(1,1)-sub2(8,5) |
| var2(1,6)= sub2(1,1)-sub2(1,6) | var2(2,6)= sub2(1,1)-sub2(2,6) | var2(3,6)= sub2(1,1)-sub2(4,6) | var2(4,6)= sub2(1,1)-sub2(5,6) | var2(5,6)= sub2(1,1)-sub2(6,6) | var2(6,6)= sub2(1,1)-sub2(7,6) | var2(7,6)= sub2(1,1)-sub2(7,6) | var2(8,6)= sub2(1,1)-sub2(8,6) |
| var2(1,7)= sub2(1,1)-sub2(1,7) | var2(2,7)= sub2(1,1)-sub2(2,7) | var2(3,7)= sub2(1,1)-sub2(4,7) | var2(4,7)= sub2(1,1)-sub2(5,7) | var2(5,7)= sub2(1,1)-sub2(6,7) | var2(6,7)= sub2(1,1)-sub2(7,7) | var2(7,7)= sub2(1,1)-sub2(7,7) | var2(8,7)= sub2(1,1)-sub2(8,7) |

Y Axis

X Axis

LUMINANCE ADJUSTMENT BETWEEN DIFFERENT RESOLUTIONS

CROSS-REFERENCE TO RELATED APPLICATION

This application claims the benefit of the Korean Patent Application No. 10-2022-0086056 filed on Jul. 13, 2022, which are hereby incorporated by reference as if fully set forth herein.

TECHNICAL FIELD

The disclosure relates to an image processing device and a method of driving the same.

BACKGROUND

Recently, with the development of multimedia industries and the development of image acquisition technologies of digital cameras, digital images similar to those seen by human eyes are being implemented. High dynamic range (HDR) images can show colors and luminance close to those of the real world, and thus images can be expressed realistically.

Such an HDR image has a wide dynamic range. However, since a dynamic range, which is expressible by typical display devices, is narrow, the typical display devices have a difficulty in implementing an HDR image. In order to implement an HDR image in the typical display device, the HDR image may be converted into a low dynamic range (LDR) image that can be implemented in the display device. A method of converting an HDR image into an LDR image is called tone mapping. Such tone mapping is also used to allow an LDR image to be expressed similar to an HDR image.

Tone mapping may be classified into global tone mapping and local tone mapping. The global tone mapping has advantages in that global contrast is preserved and a processing speed is fast, but has disadvantages in that image boundary information is lost and local contrast cannot be preserved.

In the local tone mapping, image boundary information is not lost, and local contrast can be preserved. However, the local tone mapping has a problem in that distortion occurs in an image having a certain pattern.

SUMMARY

Technical Problem

Therefore, the disclosure is designed to solve the problems and is for providing an image processing device capable of preventing image distortion when local tone mapping is applied, and a method of driving the same.

The disclosure is for providing an image processing device capable of detecting a distortable pattern that is likely to be distorted, and a method of driving the same.

Technical Solution

To solve the above problems, the disclosure may include the following configurations.

An image processing device according to an embodiment of the disclosure includes a block luminance acquirer configured to divide a plurality of pixels constituting an input image into a plurality of blocks and acquire luminance for each of the plurality of blocks, a pattern detector configured to analyze a luminance correlation between the plurality of blocks and detect a distortable pattern, and a luminance corrector configured to correct the luminance of the plurality of pixels or bypass the plurality of pixels according to whether the distortable pattern is detected.

A method of driving an image processing device according to another embodiment of the disclosure includes extracting luminance for each of a plurality of pixels constituting an input image, dividing the plurality of pixels into a plurality of blocks and acquiring luminance for each of the plurality of blocks using the luminance for each of the plurality of pixels, analyzing a luminance correlation between the plurality of blocks and detecting a distortable pattern, and determining one of a bypass mode, a total luminance correction mode, and a block luminance correction mode to be a correction mode based on whether the distortable pattern is detected.

Advantageous Effects

According to the disclosure, a distortable pattern is detected from an image, luminance of an image including a distortable pattern is not corrected, and luminance is corrected using one single gain value, thereby preventing image distortion caused by performing luminance correction for each block.

In addition, according to the disclosure, luminance of an image, which does not include a distortable pattern, is corrected according to local tone mapping, thereby obtaining an image in which local contrast is preserved without loss of boundary information.

Furthermore, according to the disclosure, a luminance correlation between a plurality of blocks is analyzed in multiple directions other than one direction, thereby increasing a detection rate of a distortable pattern.

BRIEF DESCRIPTION OF DRAWINGS

FIG. 6 is a diagram for describing a method of calculating a first luminance difference value in a first luminance analyzer.

FIG. 7 is a diagram for describing a method of calculating a change value of the first luminance difference value in the first luminance analyzer.

FIG. 8 is a diagram illustrating another example of a block luminance value of an image having a distortable pattern.

FIG. 10 is a diagram for describing a method of calculating a change value of the second luminance difference value in the second luminance analyzer.

Figure 1:
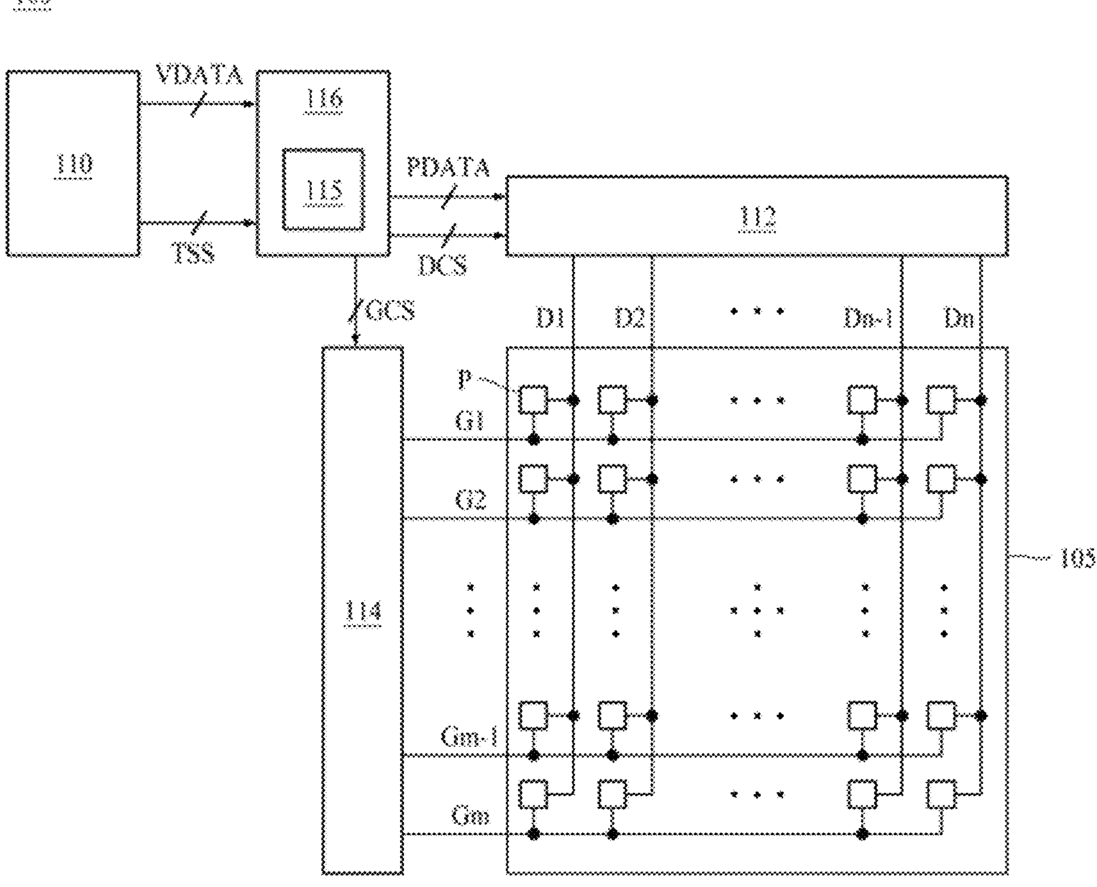
FIG. 1 is a block diagram illustrating a display device according to one embodiment of the disclosure.

| [Descriptions of Reference Numerals] | |
|---|---|
| 100: display device | 105: display panel |
| 110: host system | 112: data driver |
| 114: gate driver | 116: timing controller |
| 115: image processing device | 210: luminance extractor |
| 220: total luminance acquirer | 230: block luminance acquirer |
| 235: storage | 240: pattern detector |
| 250: luminance corrector | 260: RGB converter |

DETAILED DESCRIPTION

The same reference numbers substantially mean the same elements through the specification. In the following description, elements and functions that are irrelevant to the essentials of the disclosure and have been known to those skilled in the art may not be provided. The terms described in the present specification should be understood as follows.

The advantages and features of the disclosure and methods for accomplishing the same will be more clearly understood from embodiments to be described in detail below with reference to the accompanying drawings. However, the disclosure is not limited to the following embodiments but may be implemented in various different forms. The present embodiments are provided only to complete the disclosure and to fully provide the scope of the disclosure to a person having ordinary skill in the art to which the disclosure pertains, and the disclosure will be defined by the appended claims.

Like reference numerals refer to like elements throughout the specification. In addition, in describing the disclosure, when the detailed description of the relevant known function or configuration is determined to unnecessarily obscure an important point of the disclosure, the detailed description will be omitted.

In a case where "comprise," "have," and "include" described in the present specification are used, another part may be added unless "only" is used. Any references to singular may include plural unless expressly stated otherwise.

In describing a time relationship, for example, when the temporal order is described as "after," "subsequent," "next," or "before," a case which is not continuous may be included unless "immediately" or "right" is used.

It should be understood that, although terms such as "first," "second," and the like may be used herein to describe various components, these components are not limited by these terms. These terms are only used to distinguish one element or component from another element or component. Therefore, a first component described below could be termed a second component without departing from the scope and spirit of the disclosure.

The term "at least one" should be understood as including any and all combinations of one or more of the associated listed items. For example, the meaning of "at least one of a first item, a second item, and a third item" may denote the combination of all items proposed from two or more of the first item, the second item, and the third item as well as the first item, the second item, or the third item The features of various embodiments of the disclosure can be partially or entirely bonded to or combined with each other and can be interlocked and operated in technically various ways, and the embodiments can be carried out independently of or in association with each other.

Hereinafter, embodiments of the present specification will be described in detail with reference to the accompanying drawings.

FIG. 1 is a block diagram illustrating a display device according to one embodiment of the disclosure.

A display device 100 according to one embodiment of the disclosure may perform a display function and may be implemented as a flat panel display device such as a liquid crystal display (LCD) device or an organic light-emitting diode (OLED) display device.

As shown in FIG. 1, the display device 100 according to the disclosure includes a host system 110, a display panel 105, and a display driving device for driving the display panel 105.

The display panel 105 includes a display area in which a plurality of pixels P are provided to display an image. The display panel 105 includes a plurality of data lines D1 to Dn (n is a positive integer greater than or equal to 2), a plurality of gate lines G1 to Gm, (m is a positive integer greater than or equal to 2), and the plurality of pixels P.

Each of the plurality of data lines D1 to Dn receives a data signal. Each of the plurality of gate lines G1 to Gm receives a gate signal. The plurality of data lines D1 to Dn and the plurality of gate lines G1 to Gm are provided to intersect each other on a substrate to define the plurality of pixels P. Each of the plurality of pixels P may be connected to any one of the plurality of data lines D1 to Dn and any one of the plurality of gate lines G1 to Gm. Each of the plurality of pixels P may include a driving transistor, a scan transistor which is turned on by the gate signal of the gate line and supplies a data voltage of the data line to a gate electrode of the driving transistor, an OLED which emits light according to current between a drain and a source of the driving transistor, and a capacitor which stores a voltage of the gate electrode of the driving transistor. Accordingly, each of the plurality of pixels P may emit light according to a current supplied to the OLED.

The display driving device allows a data signal to be supplied to the plurality of pixels P included in the display panel 105, thereby allowing an image to be displayed through the display panel 105. To this end, the display driving device may include a data driver 112, a gate driver 114, and a timing controller 116.

The data driver 112 receives pixel data PDATA and a data control signal DCS from the timing controller 116.

In one embodiment, the data driver 112 may receive a clock embedded data signaling (CEDS) packet from the timing controller 116 and may obtain a clock signal, the data control signal DCS, and the pixel data PDATA from the CEDS packet. Here, the CEDS packet may be a packet in which a clock is embedded between pieces of data.

Hereinafter, for convenience of description, it will be described that the data driver 112 receives the CEDS packet including the pixel data PDATA and the data control signal DCS from the timing controller 216, but the disclosure is not necessarily limited thereto. The data driver 112 may receive each of the pixel data PDATA and the data control signal DCS from the timing controller 116.

The data driver 112 converts the pixel data PDATA in a digital form into an analog positive/negative data signal according to the data control signal DCS and supplies the analog positive/negative data signal to the pixels P through the plurality of data lines D1 to Dn.

The gate driver 114 receives a gate control signal GCS from the timing controller 116. The gate driver 114 supplies gate signals to the plurality of gate lines G1 to Gm according to the gate control signal GCS.

Specifically, the gate driver 114 generates gate signals (or scan signals) synchronized with data signals under the control of the timing controller 116 and shifts the generated gate signals to sequentially supply the shifted gate signals to the gate lines G1 to Gm. To this end, the gate driver 114 may include a plurality of gate drive integrated circuits (ICs) (not shown). The gate drive ICs may sequentially supply the gate signals synchronized with the data signals to the plurality of gate lines G1 to Gm under the control of the timing controller 116 to select data lines to which the data signals are written. The gate signal may swing between a gate high voltage and a gate low voltage.

The timing controller 116 receives digital video data VDATA and timing signals TSS from the host system 110. The timing signals TSS may include a reference clock signal (for example, a dot clock), a vertical synchronization signal, a horizontal synchronization signal, a data enable signal, and the like. The vertical synchronization signal is a signal for defining one frame period. The horizontal synchronization signal is a signal for defining one horizontal period required to supply data signals to the pixels P in one horizontal line of the display panel 105. The data enable signal is a signal for defining a period in which valid data is input. The dot clock is a signal that is repeated with a predetermined short period.

The timing controller 116 may generate the pixel data PDATA, the data control signal DCS, and the gate control signal GCS using the digital video data VDATA and the timing signals TSS. Specifically, in order to control operation timings of the data driver 112 and the gate driver 114, based on the timing signals TSS, the timing controller 116 may generate the data control signal DCS for controlling the operation timing of the data driver 112 and the gate control signal GCS for controlling the operation timing of the gate driver 114.

In addition, the timing controller 116 may convert the digital video data VDATA into the pixel data PDATA by aligning the digital video data VDATA to be in accord with a pixel structure formed in the display panel 105. As an example, a data processor may convert the digital video data VDATA for three colors (red, green, and blue) into the pixel data PDATA for four colors (white, red, green, and blue) using a preset conversion method.

During a display driving period, the timing controller 116 outputs the pixel data PDATA and the data control signal DCS to the data driver 112 and outputs the gate control signal GCS to the gate driver 114.

The host system 110 converts the digital video data VDATA into a format suitable for display on the display panel 105. The host system 110 transmits the timing signals TSS as well as the digital video data VDATA to the timing controller 116. The host system 110 may be implemented as any one of a television system, a set-top box, a navigation system, a digital video disc (DVD) player, a Blu-ray player, an electronic bulletin board, a kiosk system, a personal computer (PC), a home theater system, and a phone system to receive an input image.

The display device 100 according to one embodiment of the disclosure includes an image processing device 115 for processing an image.

The image processing device 115 may be included in the timing controller 116 as shown in FIG. 1, but the disclosure is not necessarily limited thereto. In another embodiment, the image processing device 115 may be included in a component other than the timing controller 116 or may be a separate and independent component.

The image processing device 115 processes an image corresponding to the digital video data VDATA input from the host system 110 or the pixel data PDATA converted by the timing controller 116. The image processing device 115 may receive an image (hereinafter, referred to as an "input image") corresponding to the digital video data VDATA or the pixel data PDATA and may perform tone mapping on the input image to correct luminance of the input image. The image processing device 115 may output an image of which luminance is corrected.

Hereinafter, the image processing device 115 will be described in detail with reference to FIGS. 2 to 10.

Figure 2:
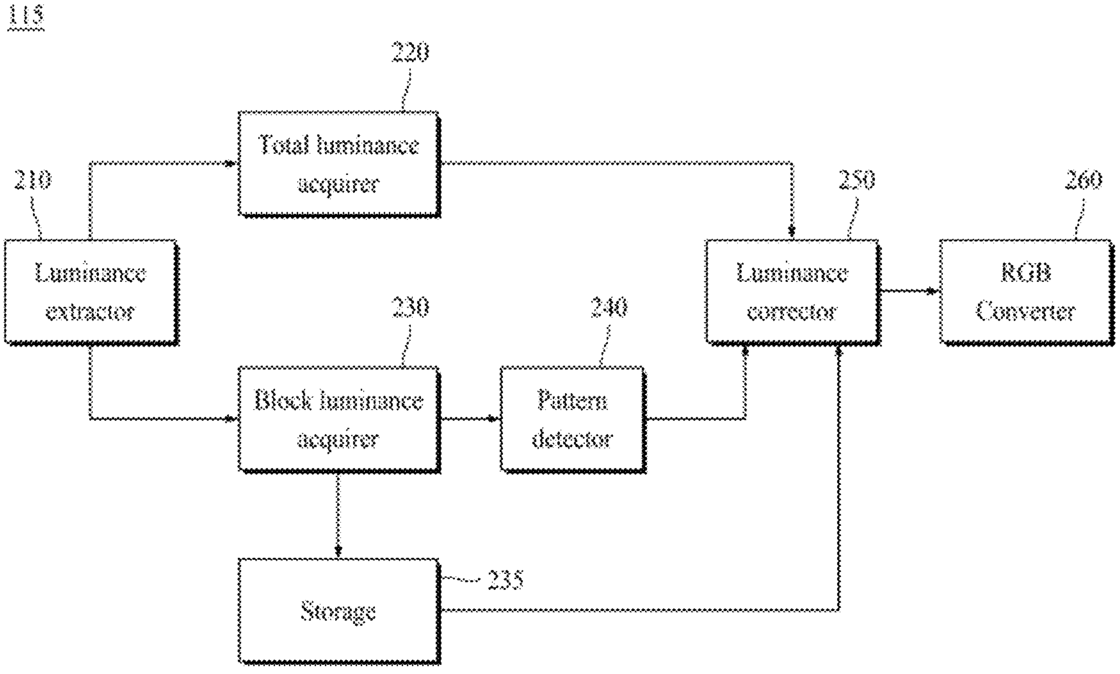
FIG. 2 is a block diagram illustrating a configuration of an image processing device shown in FIG. 1.
Figure 3:
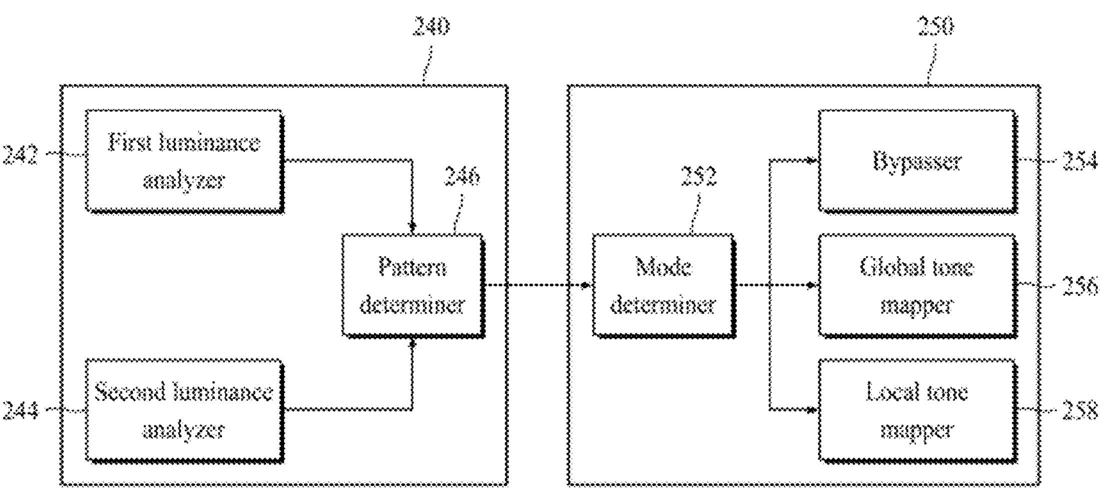
FIG. 3 is a block diagram illustrating a configuration of a pattern detector and a luminance corrector.
Figure 4:
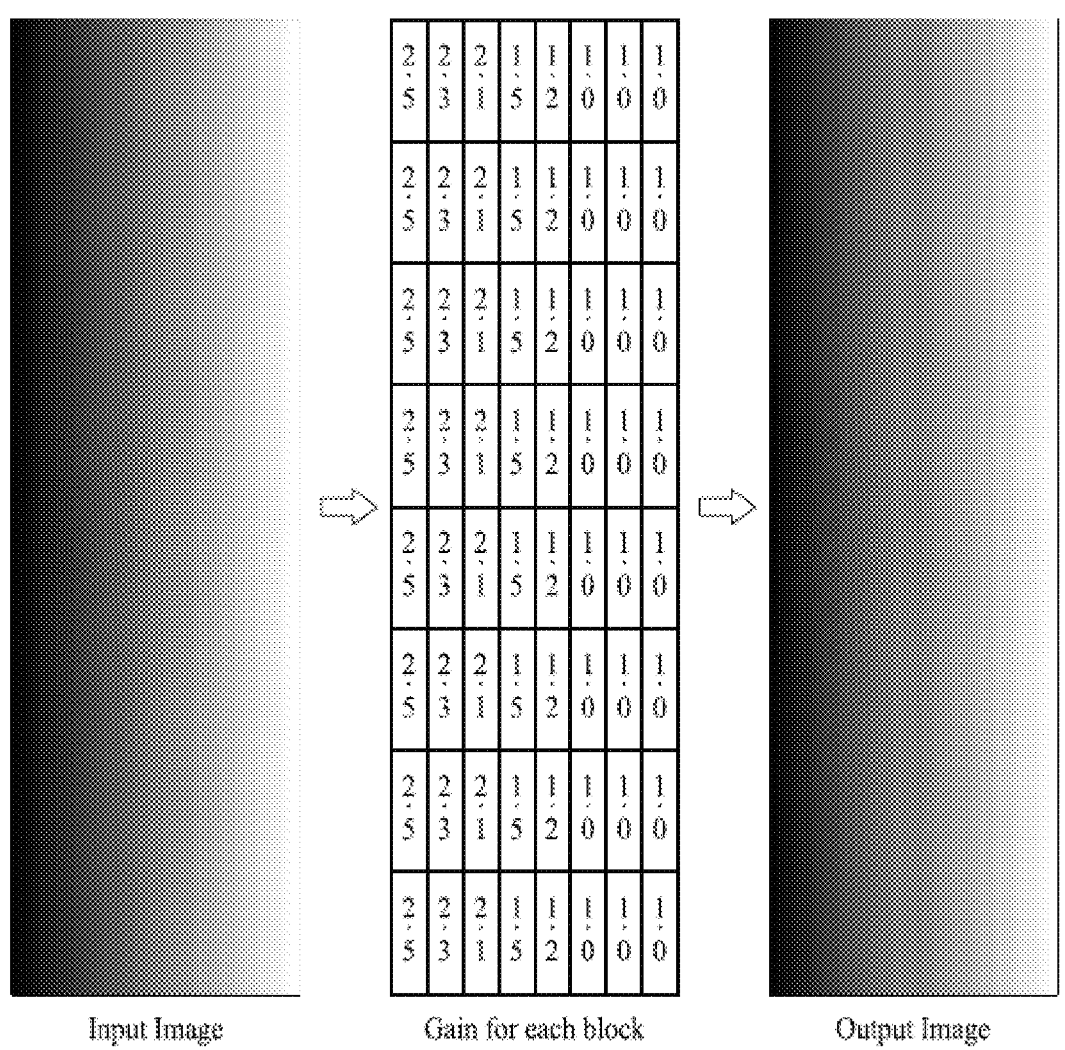
FIG. 4 is a diagram illustrating an example in which an image is distorted during local tone mapping.
Figure 5:
FIG. 5 is a diagram illustrating an example of a block luminance value of an image having a distortable pattern.
Figure 9:
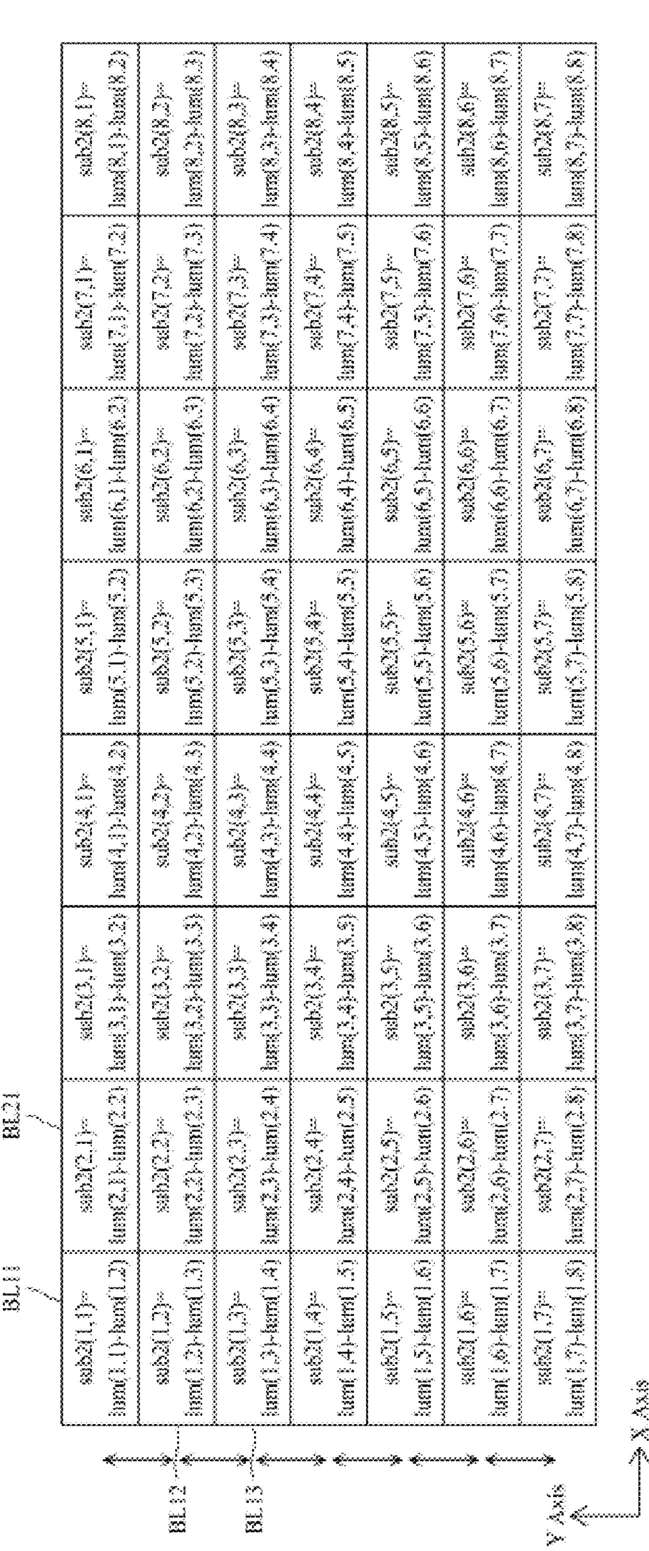
FIG. 9 is a diagram for describing a method of calculating a second luminance difference value in a second luminance analyzer.

FIG. 2 is a block diagram illustrating a configuration of the image processing device shown in FIG. 1. FIG. 3 is a block diagram illustrating a configuration of a pattern detector and a luminance corrector. FIG. 4 is a diagram illustrating an example in which an image is distorted during local tone mapping. FIG. 5 is a diagram illustrating an example of a block luminance value of an image having a distortable pattern. FIG. 6 is a diagram for describing a method of calculating a first luminance difference value in a first luminance analyzer. FIG. 7 is a diagram for describing a method of calculating a change value of the first luminance difference value in the first luminance analyzer. FIG. 8 is a diagram illustrating another example of a block luminance value of an image having a distortable pattern. FIG. 9 is a diagram for describing a method of calculating a second luminance difference value in a second luminance analyzer. FIG. 10 is a diagram for describing a method of calculating a change value of the second luminance difference value in the second luminance analyzer.

Referring to FIGS. 2 to 10, the image processing device 115 includes a luminance extractor 210, a block luminance acquirer 230, a storage 235, a pattern detector 240, a luminance corrector 250, and an RGB converter 260. In one embodiment, the image processing device 115 may further include a total luminance acquirer 220.

The luminance extractor 210 extracts luminance of each of a plurality of pixels included in an input image. Input image data may include RGB pixel values of each of the plurality of pixels. The luminance extractor 210 may extract the luminance of each of the plurality of pixels using the RGB pixel values of each of the plurality of pixels included in the input image.

The total luminance acquirer 220 acquires total luminance of the input image based on the luminance of each of the plurality of pixels extracted by the luminance extractor 210. The total luminance acquirer 220 may obtain an average luminance value of the plurality of pixels as the total luminance of the input image.

The block luminance acquirer 230 divides the input image into a plurality of blocks and acquires luminance of each of the plurality of blocks. The block luminance acquirer 230 may divide the input image into the plurality of blocks having a certain size. The plurality of blocks may have the same size, but the disclosure is not necessarily limited thereto. In another embodiment, the plurality of blocks may have different sizes. The size of the block may be preset to a fixed value, but the disclosure is not necessarily limited thereto. In still another embodiment, the size of the block may be determined based on a type of the input image. Types of images may include an animal, a people, a landscape, a downtown, a nighttime, a daytime, text, and the like.

Each of the plurality of blocks may include a plurality of pixels. The block luminance acquirer 230 may calculate an average luminance value of the pixels included in the block and may determine the calculated average luminance value to be luminance of the corresponding block.

The block luminance acquirer 230 may generate a block luminance map including luminance for each block. The block luminance acquirer 230 may store the block luminance map in the storage 235.

The pattern detector 240 analyzes a luminance correlation between the plurality of blocks to detect a distortable pattern. The pattern detector 240 may calculate a luminance difference value between each of the plurality of blocks and an adjacent block and may analyze a degree of change in luminance difference values of the plurality of blocks, that is, changes in luminance difference values, thereby detecting the distortable pattern.

As shown in FIG. 4, a distortable pattern represents a pattern in which distortion is likely to occur between an input image and an output image when luminance is corrected according to local tone mapping. In the local tone mapping, an image may be divided into a plurality of blocks, and a block gain value for each block may be determined. In this case, since the block gain value is determined based on luminance of the block, the plurality of blocks may have different block gain values according to the luminance as shown in FIG. 4. In the local tone mapping, since different block gain values are applied for each block, image distortion may occur in a boundary area.

The pattern detector 240 includes a first luminance analyzer 242, a second luminance analyzer 244, and a pattern determiner 246 which are for detecting a distortable pattern.

The first luminance analyzer 242 detects a first distortable pattern by analyzing a luminance correlation between blocks disposed in a first direction (for example, an X-axis direction). The first distortable pattern may be a pattern in which luminance gradually increases in the first direction. As an example, the first distortable pattern may be a horizontal gradation pattern as shown in FIG. 5.

The first luminance analyzer 242 may calculate a first luminance difference value sub1 between each of the plurality of blocks and an adjacent block in the first direction (for example, the X-axis direction). Specifically, the first luminance analyzer 242 may calculate a luminance difference between a block positioned at (n, m) and a block positioned at (n+1, m) and may determine the calculated luminance difference to be a first luminance difference value sub1(*n, m*) of the block positioned at (n, m). Here, n may represent $n^{th}$ in the X-axis direction, and m may represent $m^{th}$ in a Y-axis direction.

For example, as shown in FIG. 6, the first luminance analyzer 242 may calculate a luminance difference between a block BL11 positioned at (1, 1) and a block BL21 positioned at (2, 1) and may determine the calculated luminance difference to be a first luminance difference value sub1(1, 1) of the block BL11 positioned at (1, 1). When luminance of each of the plurality of blocks is as shown in FIG. 5, the first luminance analyzer 242 may determine 31, which is a difference value between a luminance of 18 of the block BL11 positioned at (1, 1) and a luminance of 49 of the block BL21 positioned at (2, 1), to be the first luminance difference value sub1(1, 1) of the block BL11 positioned at (1, 1).

In addition, the first luminance analyzer 242 may calculate a luminance difference between the block BL21 positioned at (2, 1) and a block BL31 positioned at (3, 1) and may determine the calculated luminance difference to be a first luminance difference value sub1(2, 1) of the block BL21 positioned at (2, 1). Meanwhile, the first luminance analyzer 242 may calculate a luminance difference between a block BL12 positioned at (1, 2) and a block BL22 positioned at (2, 2) and may determine the calculated luminance difference to be a first luminance difference value sub1(1, 2) of the block BL12 positioned at (1, 2).

The first luminance analyzer 242 may generate a first sub-map including the first luminance difference value sub1 of each of the plurality of blocks. The first sub-map includes the first luminance difference value sub1 between adjacent blocks, and the number of blocks thereof may be different from that in the block luminance map. When the block luminance map includes N×N blocks, the first sub-map may include (N−1)×N blocks.

The first luminance analyzer 242 may analyze changes in first luminance difference values sub1 of the plurality of blocks. Specifically, the first luminance analyzer 242 may calculate a first change value van indicating an amount of change in first luminance difference value between each of the plurality of blocks and a reference block. The first luminance analyzer 242 may calculate a difference in first luminance difference value between the block positioned at (n, m) and the reference block and may determine the calculated difference to be a first change value var1(*n, m*) of the block positioned at (n, m). In this case, the reference block may be one of the plurality of blocks. In one embodiment, the reference block may be a first block BL11 among the plurality of blocks. That is, the reference block may be a block disposed at a leftmost side of an uppermost side among the plurality of blocks.

For example, as shown in FIG. 7, the first luminance analyzer 242 may set the block BL11 positioned at (1, 1) as a reference block RBL. The first luminance analyzer 242 may calculate a difference in first luminance difference value between the block BL21 positioned at (2, 1) and the reference block RBL and may determine the calculated difference to be a first change value var1(2, 1) of the block BL21 positioned at (2, 1). In addition, the first luminance analyzer 242 may calculate a difference in first luminance difference value between a block BL13 positioned at (1, 3) and the reference block RBL and may determine the calculated difference to be a first change value var1(1, 3) of the block BL13 positioned at (1, 3). Furthermore, the first luminance analyzer 242 may calculate a difference in first luminance difference value between the block BL12 positioned at (1, 2) and the reference block RBL and may determine the calculated difference to be a first change value var1(1, 2) of the block BL12 positioned at (1, 2).

Meanwhile, since the block BL11 positioned at (1, 1) is the same as the reference block RBL, exceptionally, the first luminance analyzer 242 may compare a first luminance difference value thereof with that of the block BL21 adjacent thereto and positioned at (2, 1). That is, the first luminance analyzer 242 may determine a difference in first luminance difference value between the block BL11 positioned at (1, 1) and the block BL21 positioned at (2, 1) to be a first change value var1(1, 1) of the block BL11 positioned at (1, 1).

The first luminance analyzer 242 may generate a first change map including the first change value van for each of the plurality of blocks. The first change map may include the same number of blocks as the first sub-map. Specifically, when the block luminance map includes N×N blocks, the first sub-map and the first change map may include (N−1)×N blocks.

The second luminance analyzer 244 detects a second distortable pattern by analyzing a luminance correlation between blocks disposed in a second direction (for example, the Y-axis direction). The second distortable pattern may be a pattern in which luminance gradually increases in the second direction. As an example, the second distortable pattern may be a vertical gradation pattern as shown in FIG. 8.

The second luminance analyzer 244 may calculate a second luminance difference value sub2 between each of the plurality of blocks and an adjacent block in the second direction (for example, the Y-axis direction). Specifically, the second luminance analyzer 244 may calculate a luminance difference between a block positioned at (n, m) and a block positioned at (n, m+1) and may determine the calculated luminance difference to be a second luminance difference value sub2(*n, m*) of the block positioned at (n, m). Here, n may represent $n^{th}$ in the X-axis direction, and m may represent $m^{th}$ in the Y-axis direction.

For example, as shown in FIG. 9, the second luminance analyzer 244 may calculates a luminance difference between a block BL11 positioned at (1, 1) and a block BL12 positioned at (1, 2) and may determine the calculated luminance difference to be a second luminance difference value sub2(1, 1) of the block BL11 positioned at (1, 1). When luminance of each of the plurality of blocks is as shown in FIG. 8, the second luminance analyzer 244 may determine 31, which is a difference value between a luminance of 18 of the block BL11 positioned at (1, 1) and a luminance of 49 of the block BL12 positioned at (1, 2), to be the second luminance difference value sub2(1, 1) of the block BL11 positioned at (1, 1).

In addition, the second luminance analyzer 244 may calculate a luminance difference between the block BL12 positioned at (1, 2) and a block BL13 positioned at (1, 3) and may determine the calculated luminance difference to be a second luminance difference value sub2(1, 2) of the block BL12 positioned at (1, 2). Meanwhile, the second luminance analyzer 244 may calculate a luminance difference between a block BL21 positioned at (2, 1) and a block BL22 positioned at (2, 2) and may determine the calculated luminance difference to be a second luminance difference value sub2(2, 1) of the block BL21 positioned at (2, 1).

The second luminance analyzer 244 may generate a second sub-map including the second luminance difference value sub2 of each of the plurality of blocks. The second sub-map includes the second luminance difference value sub2 between adjacent blocks, and the number of blocks thereof may be different from that in the block luminance map. When the block luminance map includes N×N blocks, the second sub-map may include N×(N−1) blocks.

The second luminance analyzer 244 may analyze changes in second luminance difference values sub2 of the plurality of blocks. Specifically, the second luminance analyzer 244 may calculate a second change value var2 indicating an amount of change in second luminance difference value between each of the plurality of blocks and a reference block. The second luminance analyzer 244 may calculate a difference in second luminance difference value between the block positioned at (n, m) and the reference block and may determine the calculated difference to be a second change value var2(*n, m*) of the block positioned at (n, m). In this case, the reference block may be one of the plurality of blocks. In one embodiment, the reference block may be a first block BL11 among the plurality of blocks.

For example, as shown in FIG. 10, the second luminance analyzer 244 may set the block BL11 positioned at (1, 1) as a reference block RBL. The second luminance analyzer 244 may calculate a difference in second luminance difference value between the block BL21 positioned at (2, 1) and the reference block RBL and may determine the calculated difference to be a second change value var2(2, 1) of the block BL21 positioned at (2, 1). In addition, the second luminance analyzer 244 may calculate a difference in second luminance difference value between the block BL12 positioned at (1, 2) and the reference block RBL and may determine the calculated difference to be a second change value var2(1, 2) of the block BL12 positioned at (1, 2).

Meanwhile, since the block BL11 positioned at (1, 1) is the same as the reference block RBL, exceptionally, the second luminance analyzer 244 may compare a second luminance difference value thereof with that of the block BL21 adjacent thereto and positioned at (2, 1). That is, the second luminance analyzer 244 may determine a difference in second luminance difference value between the block BL11 positioned at (1, 1) and the block BL21 positioned at (2, 1) to be a second change value var2(1, 1) of the block BL11 positioned at (1, 1).

The second luminance analyzer 244 may generate a second change map including the second change value var2 for each of the plurality of blocks. The second change map may include the same number of blocks as the second sub-map. Specifically, when the block luminance map includes N×N blocks, the second sub-map and the second change map may include N×(N−1) blocks.

The image processing device 115 according to one embodiment of the disclosure may detect a distortable pattern using the first luminance difference value between adjacent blocks in the first direction and the second luminance difference value between adjacent blocks in the second direction. The image processing device 115 according to one embodiment of the disclosure may increase a detection rate of a distortable pattern by analyzing a luminance correlation between the plurality of blocks in multiple directions other than one direction.

The pattern determiner 246 determines whether a distortable pattern is detected based on changes in luminance difference values of the plurality of blocks.

Specifically, the pattern determiner 246 may determine whether the first distortable pattern is detected based on changes in first luminance difference values of the plurality of blocks. The first distortable pattern may be a pattern in which luminance gradually increases in the first direction, and a change in luminance thereof may be constant. That is, in the first distortable pattern, a change value of the first luminance difference value may be small in an entire image. The pattern determiner 246 may detect the first distortable pattern using the fact that, in the case of the first distortable pattern, the change value of the first luminance difference value is small.

In one embodiment, the pattern determiner 246 may determine whether the first distortable pattern is detected based on the number of blocks in which the change value var1 of the first luminance difference value is less than or equal to a first threshold among the plurality of blocks. The pattern determiner 246 may check the first change values var1 of the plurality of blocks through the first change map. The pattern determiner 246 may obtain the number of blocks in which the first change value var1 is less than or equal to the first threshold, and when the obtained number of blocks is greater than a second threshold, the pattern determiner 246 may determine that the first distortable pattern is detected.

In another embodiment, the pattern determiner 246 may determine whether the first distortable pattern is detected based on a value obtained by summing the change values var1 of the first luminance difference values of the plurality of blocks. The pattern determiner 246 may sum the first change values var1 of the plurality of blocks included in the first change map. When the value obtained by summing the first change values var1 of the plurality of blocks is less than a third threshold, the pattern determiner 246 may determine that the first distortable pattern is detected.

In still another embodiment, the pattern determiner 246 may determine whether the first distortable pattern is detected based on blocks in which the change values var1 of the first luminance difference values are greater than or equal to a fourth threshold among the plurality of blocks. The pattern determiner 246 may extract the blocks in which the first change value var1 is greater than or equal to the fourth threshold among the plurality of blocks through the first change map. The pattern determiner 246 may sum the first change values var1 of the extracted blocks, and when a value obtained by summing the first change values var1 is less than a fifth threshold, the pattern determiner 246 may determine that the first distortable pattern is detected.

Meanwhile, the pattern determiner 246 may determine whether the second distortable pattern is detected based on changes in second luminance difference values of the plurality of blocks. The second distortable pattern may be a pattern in which luminance gradually increases in the second direction (for example, the Y-axis direction), and a change in luminance thereof may be constant. That is, in the second distortable pattern, a change value of the second luminance difference value may be small in an entire image. The pattern determiner 246 may detect the second distortable pattern using the fact that, in the case of the second distortable pattern, the change value of the second luminance difference value is small.

In one embodiment, the pattern determiner 246 may determine whether the second distortable pattern is detected based on the number of blocks in which the change value var2 of the second luminance difference value is less than or equal to a first threshold among the plurality of blocks. The pattern determiner 246 may check the second change values var2 of the plurality of blocks through the second change map. The pattern determiner 246 may obtain the number of blocks in which the second change value var2 is less than or equal to the first threshold, and when the obtained number of blocks is greater than a second threshold, the pattern determiner 246 may determine that the second distortable pattern is detected.

In another embodiment, the pattern determiner 246 may determine whether the second distortable pattern is detected based on a value obtained by summing the change values var2 of the second luminance difference values of the plurality of blocks. The pattern determiner 246 may sum the second change values var2 of the plurality of blocks included in the second change map. When the value obtained by summing the second change values var2 of the plurality of blocks is less than a third threshold, the pattern determiner 246 may determine that the second distortable pattern is detected.

In still another embodiment, the pattern determiner 246 may determine whether the second distortable pattern is detected based on blocks in which the change values var2 of the second luminance difference values are greater than or equal to a fourth threshold among the plurality of blocks. The pattern determiner 246 may extract the blocks in which the second change value var2 is greater than or equal to the fourth threshold among the plurality of blocks through the second change map. The pattern determiner 246 may sum the second change values var2 of the extracted blocks, and when a value obtained by summing the second change values var2 is less than a fifth threshold, the pattern determiner 246 may determine that the second distortable pattern is detected.

When at least one of the first distortable pattern and the second distortable pattern is detected, the pattern determiner 246 may generate a pattern detection signal to transmit the generated pattern detection signal to the luminance corrector 250.

The luminance corrector 250 corrects luminance of a plurality of pixels included in an input image or bypasses the pixels according to whether a distortable pattern is detected. The luminance corrector 250 includes a mode determiner 252, a bypasser 254, and a local tone mapper 258.

The mode determiner 252 may determine one of a bypass mode and a block luminance correction mode to be a correction mode according to whether a distortable pattern is detected. When the pattern detector 240 determines that the distortable pattern is detected, the mode determiner 252 may determine the bypass mode to be the correction mode. On the other hand, when the pattern detector 240 does not detect the distortable pattern, the mode determiner 252 may determine the block luminance correction mode to be the correction mode.

In one embodiment, the luminance corrector 250 may further include a global tone mapper 256. In this case, the mode determiner 252 may determine one of the bypass mode, a total luminance correction mode, and the block luminance correction mode to be the correction mode according to whether a distortable pattern is detected. When the pattern detector 240 determines that the distortable pattern is detected, the mode determiner 252 may determine one of the bypass mode and the total luminance correction mode to be the correction mode. On the other hand, when the pattern detector 240 does not detect the distortable pattern, the mode determiner 252 may determine the block luminance correction mode to be the correction mode.

When the bypass mode is determined by the mode determiner 252, the bypasser 254 may bypass a plurality of pixels without correcting luminance of the pixels.

The image processing device 115 according to one embodiment of the disclosure may not correct luminance of an image including a distortable pattern. Accordingly, the image processing device 115 according to one embodiment of the disclosure may prevent image distortion caused by performing luminance correction for each block.

When the total luminance correction mode is determined by the mode determiner 252, the global tone mapper 256 may correct luminance of an entire input image. In this case, the global tone mapper 256 may correct luminance of a plurality of pixels included in the input image using one gain value.

Specifically, the global tone mapper 256 may determine a total gain value based on total luminance of the input image obtained by the total luminance acquirer 220. The global tone mapper 256 may correct the luminance of the plurality of pixels included in the input image using the total gain value. For example, the global tone mapper 256 may correct luminance by multiplying the luminance of each of the plurality of pixels by the total gain value.

The image processing device 115 according to one embodiment of the disclosure may correct luminance of an image including a distortable pattern using one gain value. Accordingly, the image processing device 115 according to one embodiment of the disclosure may prevent image distortion caused by performing luminance correction using different gain values for each block.

When the block luminance correction mode is determined by the mode determiner 252, the local tone mapper 258 corrects the luminance of each of the plurality of blocks. In this case, the local tone mapper 258 may correct luminance of pixels included in a block using a different gain value for each block.

Specifically, the local tone mapper 258 may determine a block gain value for each block based on the luminance of each of the plurality of blocks obtained by the block luminance acquirer 230. The local tone mapper 258 may correct the luminance of the pixels included in the block using the block gain value. For example, the local tone mapper 258 may correct luminance by multiplying the luminance of each of the plurality of pixels by a block gain value corresponding to a block including a corresponding pixel.

The image processing device 115 according to one embodiment of the disclosure may correct luminance of an image, which does not include a distortable pattern, according to local tone mapping, thereby obtaining an image in which local contrast is preserved without loss of boundary information.

The RGB converter 260 may convert luminance of each of the plurality of pixels, of which luminance is corrected or which are bypassed into RGB pixel values by the luminance corrector 250. The RGB converter 260 may output image data in which luminance is converted into the RGB pixel values.

Figure 11:
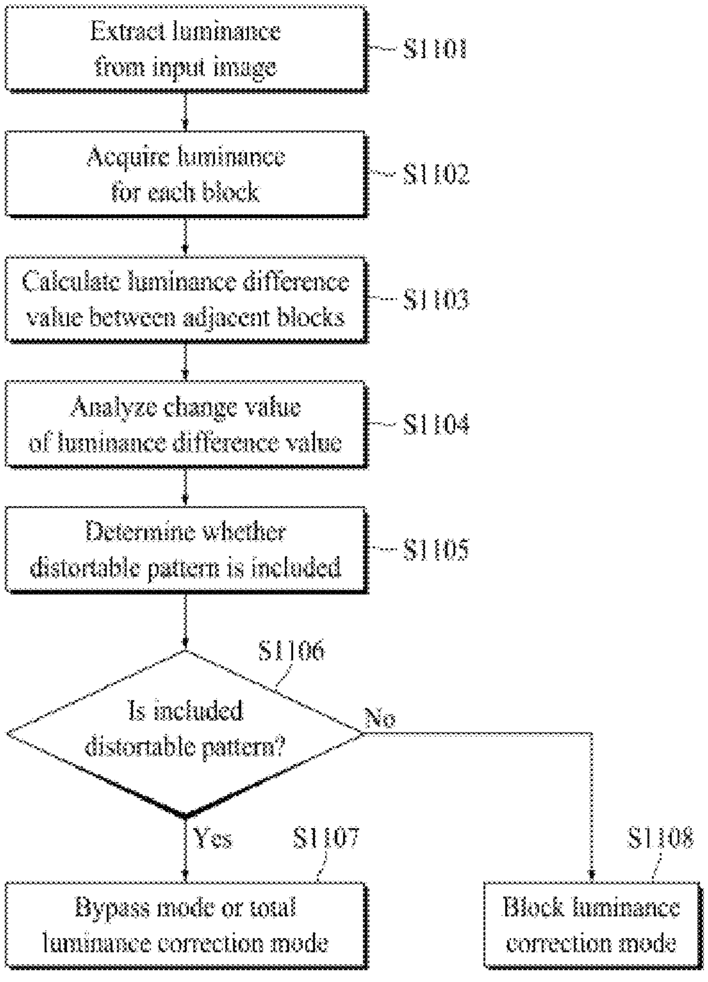
FIG. 11 is a flowchart illustrating a method of driving an image processing device according to one embodiment of the disclosure.

FIG. 11 is a flowchart illustrating a method of driving an image processing device according to one embodiment of the disclosure.

Referring to FIG. 11, an image processing device 115 extracts luminance of each of a plurality of pixels included in an input image (S1101). Input image data may include RGB pixel values of each of the plurality of pixels. The image processing device 115 may extract the luminance of each of the plurality of pixels using the RGB pixel values of each of the plurality of pixels included in the input image.

Next, the image processing device 115 obtains luminance for each block using the luminance of each of the plurality of pixels (S1102). Specifically, the image processing device 115 may divide the input image into a plurality of blocks having a certain size. The plurality of blocks may have the same size, but the disclosure is not necessarily limited thereto. In another embodiment, the plurality of blocks may have different sizes. The size of the block may be preset to a fixed value, but the disclosure is not necessarily limited thereto.

The image processing device 115 may calculate an average luminance value of the pixels included in the block and may determine the calculated average luminance value to be luminance of the corresponding block. The image processing device 115 may generate a block luminance map including luminance for each block.

Although not shown in FIG. 11, the image processing device 115 may acquire total luminance of the input image using the luminance of each of the plurality of pixels. The image processing device 115 may calculate an average luminance value of the plurality of pixels and may obtain the calculated average luminance value as the total luminance of the input image.

Next, the image processing device 115 calculates a luminance difference value between adjacent blocks (S1103).

Specifically, the image processing device 115 may calculate a first luminance difference value between each of the plurality of blocks and an adjacent block in a first direction (for example, an X-axis direction). The image processing device 115 may generate a first sub-map including the first luminance difference value for each of the plurality of blocks. The first sub-map includes the first luminance difference value between the adjacent blocks, and the number of blocks thereof may be different from that in a block luminance map. When the block luminance map includes N×N blocks, the first sub-map may include (N−1)×N blocks.

In one embodiment, the image processing device 115 may further calculate a second luminance difference value between each of the plurality of blocks and an adjacent block in a second direction (for example, a Y-axis direction). The image processing device 115 may generate a second change map including the second change value for each of the plurality of blocks. The second change map may include the same number of blocks as a second sub-map. Specifically, when the block luminance map includes N×N blocks, the second sub-map and the second change map may include N×(N−1) blocks.

Next, the image processing device 115 analyzes a degree of change in luminance difference values of the plurality of blocks, that is, changes in luminance difference values (S1104).

Specifically, the image processing device 115 may analyze changes in first luminance difference values of the plurality of blocks. The image processing device 115 may calculate a first change value indicating an amount of change in first luminance difference value between each of the plurality of blocks and a reference block. In this case, the reference block may be one of the plurality of blocks. In one embodiment, the reference block may be a first block among the plurality of blocks.

The image processing device 115 may generate a first change map including the first change value for each of the plurality of blocks. The first change map may include the same number of blocks as the first sub-map. Specifically, when the block luminance map includes N×N blocks, the first sub-map and the first change map may include (N−1)×N blocks.

In one embodiment, when calculating the second luminance difference values of the plurality of blocks, the image processing device 115 may also analyze a change in second luminance difference value. The image processing device 115 may calculate a second change value indicating an amount of change in second luminance difference value between each of the plurality of blocks and a reference block. In this case, the reference block may be one of the plurality of blocks. In one embodiment, the reference block may be a first block among the plurality of blocks.

The image processing device 115 may generate the second change map including the second change value for each of the plurality of blocks. The second change map may include the same number of blocks as the second sub-map. Specifically, when the block luminance map includes N×N blocks, the second sub-map and the second change map may include N×(N−1) blocks.

Next, the image processing device 115 determines whether a distortable pattern is included based on a change in luminance difference value (S1105).

The image processing device 115 may determine whether a first distortable pattern is included based on the changes in first luminance difference values of the plurality of blocks. The first distortable pattern may be a pattern in which luminance gradually increases in the first direction, and a change in luminance thereof may be constant. That is, in the first distortable pattern, a change value of the first luminance difference value may be small in an entire image. The image processing device 115 may detect the first distortable pattern using the fact that, in the case of the first distortable pattern, the change value of the first luminance difference value is small.

In one embodiment, the image processing device 115 may check the number of blocks in which the change value of the first luminance difference value is less than or equal to a first threshold among the plurality of blocks, and when the checked number of blocks is greater than a second threshold, the image processing device 115 may determine that the first distortable pattern is included in the input image.

In another embodiment, the image processing device 115 may sum change values of the first luminance difference values of the plurality of blocks, that is, the first change values, and when a value obtained by summing the change values is less than a third threshold, the image processing device 115 may determine that the first distortable pattern is included in the input image.

In still another embodiment, the image processing device 115 may extract blocks in which the change value of the first luminance difference value is greater than or equal to a fourth threshold among the plurality of blocks and may sum the first change values of the extracted blocks. When a value obtained by summing the first change values is less than a fifth threshold, the image processing device 115 may determine that the first distortable pattern is included in the input image.

Meanwhile, the image processing device 115 may determine whether a second distortable pattern is included based on changes in second luminance difference values of the plurality of blocks. The second distortable pattern may be a pattern in which luminance gradually increases in the second direction (for example, the Y-axis direction), and a change in luminance thereof may be constant. That is, in the second distortable pattern, a change value of the second luminance difference value may be small in an entire image. The image processing device 115 may detect the second distortable pattern using the fact that, in the case of the second distortable pattern, the change value of the second luminance difference value is small.

In one embodiment, the image processing device 115 may check the number of blocks in which the change value of the second luminance difference value is less than or equal to the first threshold among the plurality of blocks, and when the checked number of blocks is greater than the second threshold, the image processing device 115 may determine that the second distortable pattern is included in the input image.

In another embodiment, the image processing device 115 may sum change values of the second luminance difference values of the plurality of blocks, that is, the second change values, and when a value obtained by summing the change values is less than the third threshold, the image processing device 115 may determine that the second distortable pattern is included in the input image.

In still another embodiment, the image processing device 115 may extract blocks in which the change value of the second luminance difference value is greater than or equal to the fourth threshold among the plurality of blocks and may sum the second change values of the extracted blocks. When a value obtained by summing the second change values is less than the fifth threshold, the image processing device 115 may determine that the second distortable pattern is included in the input image.

The image processing device 115 may determine one of a bypass mode, a total luminance correction mode, and a block luminance correction mode to be a correction mode according to whether a distortable pattern is detected. Specifically, when it is determined that the distortable pattern is included in the input image, the image processing device 115 determines the bypass mode or the total luminance correction mode to be the correction mode (S1106 and S1107).

When the bypass mode is determined, the image processing device 115 may bypass the plurality of pixels without correcting luminance of the pixels. Alternatively, when the total luminance correction mode is determined, the image processing device 115 may correct luminance of the entire input image. In this case, the image processing device 115 may correct the luminance of the plurality of pixels included in the input image using one gain value.

Specifically, the image processing device 115 may determine a total gain value based on total luminance of the input image. The image processing device 115 may correct the luminance of the plurality of pixels included in the input image using the total gain value. For example, the image processing device 115 may correct luminance by multiplying the luminance of each of the plurality of pixels by the total gain value.

When it is determined that the distortable pattern is not included in the input image, the image processing device 115 determines the block luminance correction mode to be the correction mode (S1106 and S1108).

When the block luminance correction mode is determined, the image processing device 115 may correct the luminance of each of the plurality of blocks. In this case, the image processing device 115 may correct luminance of pixels included in a block using a different gain value for each block.

Specifically, the image processing device 115 may determine a block gain value for each block based on the luminance of each of the plurality of blocks. The image processing device 115 may correct the luminance of the pixels included in the block using the block gain value. For example, the image processing device 115 may correct luminance by multiplying the luminance of each of the plurality of pixels by a block gain value corresponding to a block including a corresponding pixel.

It will be understood by those skilled in the art to which the disclosure pertains that the disclosure can be carried out in other detailed forms without changing the technical spirits and essential features thereof.

In addition, methods described herein may be at least partially implemented using one or more computer programs or components. These components may be provided as a series of computer instructions through a computer-readable medium or machine-readable medium including volatile and nonvolatile memories. The instructions may be provided as software or firmware and may be entirely or partially implemented in hardware components such as application-specific integrated circuits (ASICs), field-programmable gate arrays (FPGAs), digital signal processors (DSPs), or any other similar device. The instructions may be configured to be executed by one or more processors or other hardware components, and the processors or other hardware components are allowed to perform all or part of methods and procedures disclosed herein when executing the series of computer instructions.

The present specification as illustrated above is not limited to the above-described embodiments and the accompanying drawings. It will be apparent to those skilled in the art to which the disclosure pertains that various substitutions, modifications, and variations may be made thereto without departing from the scope of the disclosure. Therefore, the scope of the present specification is indicated by the following claims. The meaning and scope of the claims and altered or modified forms derived from equivalent concepts thereto should be interpreted as being included in the scope of the present specification.

What is claimed is:

1. An image processing device comprising one or more processors having instructions stored in non-transitory computer-readable media, wherein the instructions, when executed, cause the one or more processors to:

divide a plurality of pixels constituting an input image into a plurality of blocks and acquire luminance for each of the plurality of blocks;

obtain an average luminance value of the plurality of pixels constituting the input image as total luminance;

analyze a luminance correlation between the plurality of blocks and detect a distortable pattern;

determine that the distortable pattern is detected and determine a total luminance correction mode to be a correction mode in response to the distortable pattern being detected; and correct luminance of the plurality of pixels according to the correction mode, wherein the distortable pattern includes at least one of a horizontal gradation pattern in which luminance gradually changes in a first direction or a vertical gradation pattern in which luminance gradually changes in a second direction different from the first direction, and wherein, when the total luminance correction mode is determined to be the correction mode, the one or more processors are configured to determine a total gain value based on the total luminance and correct the luminance of the plurality of pixels based on the total gain value.

2. The image processing device of claim 1, wherein the one or more processors are further configured to obtain an average luminance value of pixels included in a block as luminance of the block.

3. The image processing device of claim 1, wherein the one or more processors are further configured to calculate a luminance difference value between each of the plurality of blocks and an adjacent block and analyze changes in luminance difference values of the plurality of blocks to detect the distortable pattern.

4. The image processing device of claim 1, wherein the one or more processors are further configured to:

calculate a first luminance difference value between each of the plurality of blocks and an adjacent block in the first direction and analyze changes in first luminance difference values of the plurality of blocks in the first direction; and determine whether the distortable pattern is detected based on the changes in the first luminance difference values.

5. The image processing device of claim 4, wherein the one or more processors are further configured to:

calculate a change value of the first luminance difference value between each of the plurality of blocks and a reference block; and wherein the reference block is a first block among the plurality of blocks.

6. The image processing device of claim 5, wherein the one or more processors are further configured to determine the distortable pattern based on the number of blocks in which the change values of the first luminance difference values are less than or equal to a first threshold among the plurality of blocks.

7. The image processing device of claim 5, wherein the one or more processors are further configured to determine the distortable pattern based on a value obtained by summing the change values of the first luminance difference values of the plurality of blocks.

8. The image processing device of claim 5, wherein the one or more processors are further configured to extract blocks in which the change values of the first luminance difference values are greater than or equal to a second threshold among the plurality of blocks and determine the distortable pattern based on a value obtained by summing the change values of the first luminance difference values of the extracted blocks.

9. The image processing device of claim 4, wherein the one or more processors are further configured to calculate a second luminance difference value between each of the plurality of blocks and an adjacent block in the second direction and analyze changes in second luminance difference values of the plurality of blocks in the second direction.

10. The image processing device of claim 1, wherein, the one or more processors are further configured to, when the distortable pattern is not detected, determine a block gain value for each block based on the luminance of each of the plurality of blocks and correct the luminance of pixels included in each block based on the block gain value for each block.

11. A method of driving an image processing device, the method comprising:

extracting luminance for each of a plurality of pixels constituting an input image;

obtaining an average luminance value of the plurality of pixels constituting the input image as total luminance;

dividing the plurality of pixels into a plurality of blocks and acquiring luminance for each of the plurality of blocks using the luminance for each of the plurality of pixels;

analyzing a luminance correlation between the plurality of blocks and detecting a distortable pattern;

determining that the distortable pattern is detected and determining bypass mode, and a total luminance correction mode to be a correction mode in response to when the distortable pattern being detected; and correcting luminance of the plurality of pixels according to the correction mode, wherein the distortable pattern includes at least one of a horizontal gradation pattern in which luminance gradually changes in a first direction or a vertical gradation pattern in which luminance gradually changes in a second direction different from the first direction, and wherein, when the total luminance correction mode is determined to be the correction mode, determining a total gain value based on the total luminance and correcting the luminance of the plurality of pixels based on the total gain value.

12. The method of claim 11, wherein the acquiring of the luminance for each of the plurality of blocks includes calculating an average luminance value of pixels included in each of the plurality of blocks and determining the calculated average luminance value to be luminance of each of the plurality of blocks.

13. The method of claim 11, wherein the detecting of the distortable pattern includes calculating a luminance difference value between each of the plurality of blocks and an adjacent block and detecting the distortable pattern based on a degree of change in luminance difference values of the plurality of blocks.

14. The method of claim 13, wherein the detecting of the distortable pattern includes calculating a first luminance difference value between adjacent blocks in the first direction and a second luminance difference value between adjacent blocks in the second direction and detecting the distortable pattern based on at least one of a degree of change in the first luminance difference value and a degree of change in the second luminance difference value.

15. The method of claim 14, wherein the detecting of the distortable pattern includes:

calculating a change value of the first luminance difference value between each of the plurality of blocks and a reference block and determining the degree of change in the first luminance difference value based on the calculated change value of the first luminance difference value; and calculating a change value of the second luminance difference value between each of the plurality of blocks and the reference block and determining the degree of change in the second luminance difference value based on the calculated change value of the second luminance difference value.

16. The method of claim 11, wherein the determining includes, when the distortable pattern is not detected, determining the block luminance correction mode to be the correction mode and correcting the luminance for each of the plurality of pixels constituting the input image using a block gain value corresponding to a block including a corresponding pixel.

* * * * *